J. W. KELLEY.
Whiffletree.

No. 80,551.  Patented Aug. 4, 1868.

Witnesses:
J. H. Burridge
K. Coon

Inventor
J. W. Kelley

United States Patent Office.

J. W. KELLEY, OF CLEVELAND, OHIO.

Letters Patent No. 80,551, dated August 4, 1868.

---

IMPROVED WHIFFLE-TREE.

---

*The Schedule referred to in these Letters Patent and making part of the same.*

---

TO ALL WHOM IT MAY CONCERN:

Be it known that I, J. W. KELLEY, of Cleveland, in the county of Cuyahoga, and State of Ohio, have invented certain new and useful Improvements in Whiffle-Tree; and I do hereby declare that the following is a full and complete description of the same, reference being had to the accompanying drawings, making a part of this specification, in which—

Figure 1:
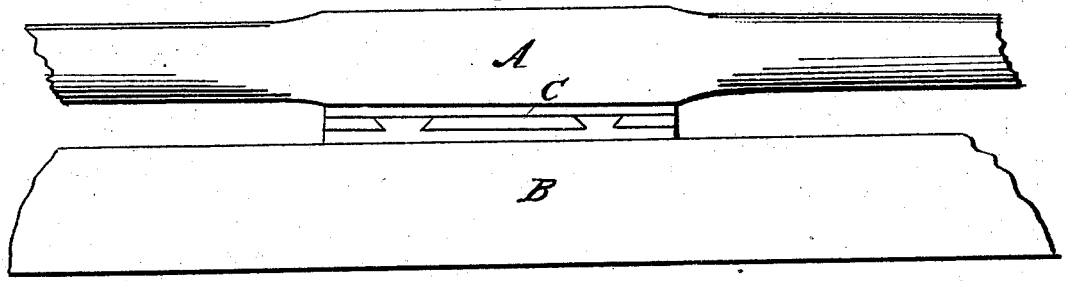
Figure 2:
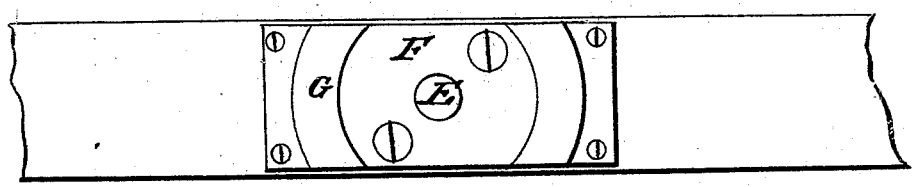
Figure 3:
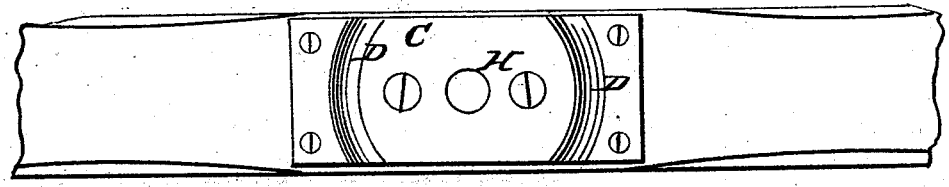

Figure 1 is a side view.
Figure 2, a detached view of the cross-bar.
Figure 3, a detached view of whiffle-tree.
Figure 4, detached plates.

Like letters of reference refer to like parts in the views.

In fig. 1, A represents the whiffle-tree, and B the cross-bar, to which it is attached. C is a metallic plate, in the face of which are formed dove-tailed segmental grooves, D, said segments having a common centre-pin, B'. Corresponding to these grooves are arranged on the plate F, dove-tailed segmental ribs, G, having a common centre or hole, H, for the admission of the pin B'.

These ribs are made to fit and work freely in the grooves D on the two plates, being brought together for the purpose of coupling the whiffle-tree to the cross-bar.

Either of said plates is secured to the under side of the whiffle-tree, as shown in fig. 3, and to the upper side of the cross-bar. The two are then placed together, as shown in fig. 1, in which it will be seen that the rib is enclosed by the groove, and in which it freely slides on turning the whiffle-tree, and at the same time attaching the whiffle-tree to the bar in a neat, secure, and permanent manner.

The usual manner of coupling the whiffle-tree to the bar is by inserting a bolt through them, said bolt forming a pivot, on which the whiffle-tree swings.

For greater security, a stay or clamp is made to embrace the tree and bar from behind, and through the ends of which the bolt is inserted.

This manner of coupling is not only expensive but insecure, as the nut on the bolt referred to often works off, and said bolt, in consequence, is liable to drop out. But when the coupling is made in the manner as above described, no bolt or stay is required, as the rib and groove secure the whiffle-tree in the bar, not only with greater safety, but at a much less expense. It is also neater in appearance, and the tree can be put on or taken off much easier and in less time than one coupled with a bolt and clamp in the ordinary way.

What I claim as my improvement, and desire to secure by Letters Patent, is—

The dove-tailed groove-plate C, in combination with the dove-tailed ribbed plate F, in the manner as and for the purpose set forth.

J. W. KELLEY.

Witnesses:
 W. H. BURRIDGE,
 P. F. McGUIRE.